April 10, 1962 J. C. KRETZING 3,029,393

DETECTOR ASSEMBLY HOLDER AND COUPLING DEVICE IN A COAXIAL LINE RESONATOR

Filed Oct. 12, 1956

INVENTOR
JOHN C. KRETZING
BY
R. V. Braddock
ATTORNEY

Patented Apr. 10, 1962

3,029,393

DETECTOR ASSEMBLY HOLDER AND COUPLING DEVICE IN A COAXIAL LINE RESONATOR

John C. Kretzing, Hicksville, N.Y., assignor to Sperry Rand Corporation, a corporation of Delaware Filed Oct. 12, 1956, Ser. No. 615,564
3 Claims. (Cl. 329—162)

Figures 1, 2:
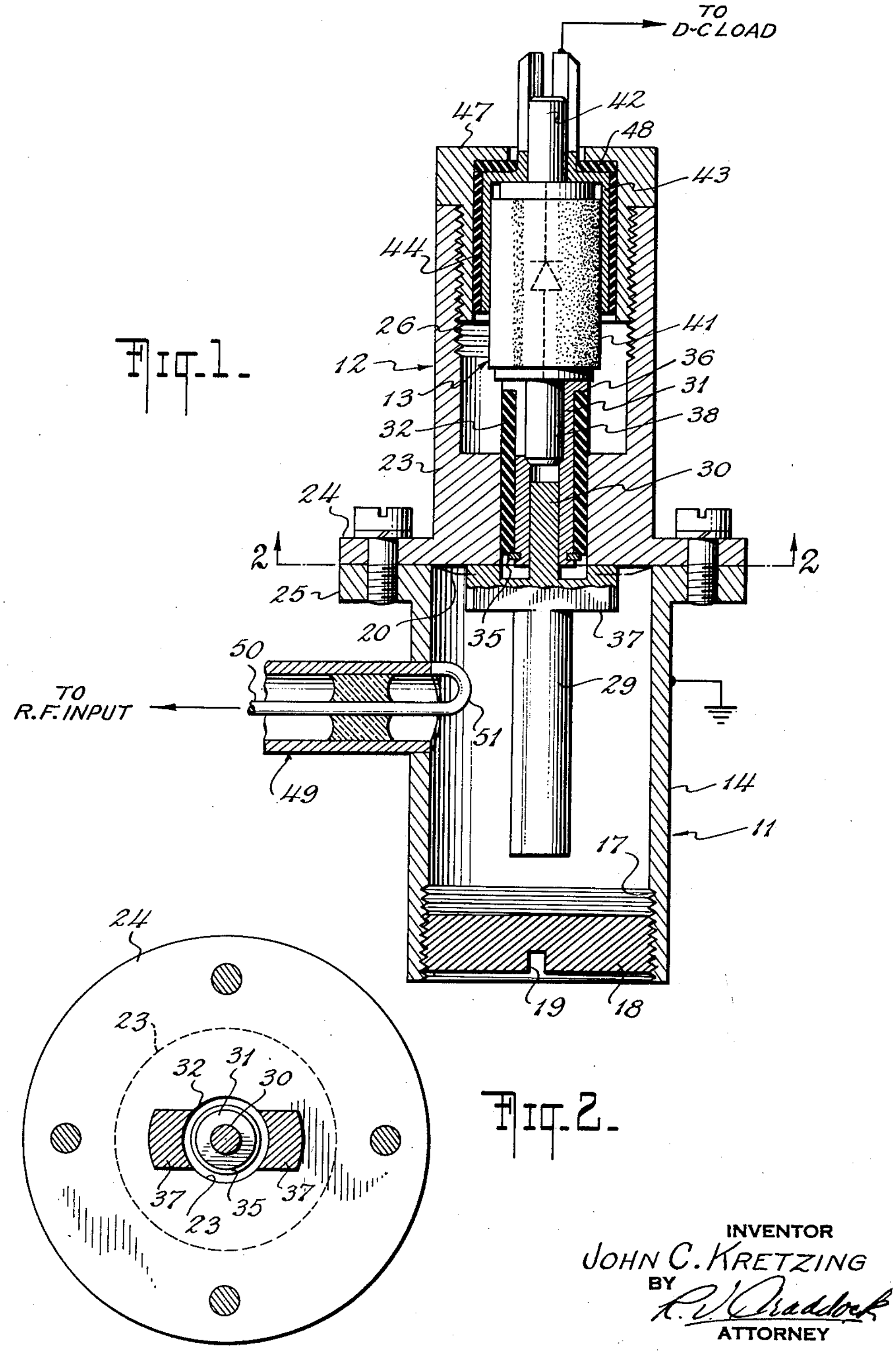

The present invention relates to apparatus comprising a microwave detector assembly holder and coupling device for a coaxial line resonator.

When a microwave detector such as a crystal is utilized for detecting radio frequency energy within a coaxial line resonator, the detector has heretofore generally been coupled to the resonator by coaxial transmission line means having an inner conductor passing through one of the outer resonator walls and terminated by a loop connected to said one resonator wall within the resonator interior. The other end of the transmission line means is terminated by the crystal.

Heretofore, the presence of the center conductor of a resonator as aforedescribed has dictated that the transmission line coupling means extend radially of the resonator from a side wall or through an end wall eccentrically of the resonator axis. This can be disadvantageous for certain microwave systems having special placement and spacing requirements as the combination of a resonator, crystal detector assembly and coupling means therebetween, unless all the elements of the combination are in coaxial relationship, might become undesirably bulky. This is especially the case where standard cartridge or coaxial type crystals are employed since they approach the size of coaxial line resonators for operation at microwave frequencies.

Therefore, it is an object of the present invention to provide a compact crystal detector mounting assembly and coupling means for a coaxial line resonator wherein the mounting assembly and coupling means are coaxial with the resonator axis.

It is a further object of the present invention to provide a device as aforedescribed in which the crystal detector can be readily interchanged with another detector of the same type without affecting the subsequent operation of the resonator and coupling means between the crystal and resonator.

It is still another object of the invention to provide a device as aforedescribed wherein the resonator is of the reentrant coaxial line type and includes tuning means for readily adjusting the resonator frequency.

The foregoing and other objects of the present invention are attained by a crystal detector mounting and coupling assembly comprising an outer conductive housing having an apertured end face for providing an end wall of the coaxial line resonator with center conductor means extending through said apertured end face and supported by said housing in coaxial relationship therewith, a portion of the center conductor means comprising the center conductor of the coaxial line resonator. The aforementioned housing and the inner conductor means therewithin form a transmission line for coupling between the resonator and a crystal, the housing and an end of the inner conductor means being adapted to receive and support the crystal in coaxial relationship therewith. Shielding means are provided between the aforementioned end wall of the resonator and the center conductor means extending therethrough for partially shielding said inner conductor in the vicinity of said aperture from electric field lines of force within the resonator so that only a portion or sample of the microwave energy within the resonator reaches the crystal, the shielding means providing a ground path between the crystal and resonator for direct current passage through the crystal.

Referring to the drawings,

FIG. 1 is a sectional view showing the combination of a coaxial line resonator, crystal detector assembly holder and coupling apparatus of the present invention with a cartridge-type crystal being shown in place at the end of the assembly holder; and FIG. 2 is a cross-sectional view of the device taken along the line 2—2 in FIG. 1.

In the drawings, 11 designates a coaxial line, reentrant type resonator upon which a metallic crystal assembly holder 12 is supported for coaxial mounting of a cartridge-type crystal detector 13 desired to be coupled to the resonator. The crystal detector cartridge 13 is illustrated by a side elevational view in FIG. 1 rather than in section, the dotted lines therewithin schematically representing the crystal and its direct current path from one crystal contact pin to the other.

The outer boundary of the aforementioned resonator 11 is comprised of a cylindrical metallic tube 14 internally threaded at one end as indicated by the numeral 17. A threaded metallic plug 18 is received at the threaded end of tube 14 for providing an adjustable resonator end wall for tuning purposes. A slot 19 is provided in plug 18 for the foregoing adjustment.

The other end of the cylinder 14 is closed by an apertured end face 20 of an outer conductor or housing 23 of holder 12. A flanged extension 24 at an end of conductor 23 is screwed to a flange extension 25 at the adjacent end of conductor 14 for holding conductors 23 and 14 in fixed coaxial relationship.

The outer conductor or housing 23 of the crystal assembly holder and coupling device 12 is comprised of first and second sections of different internal diameters, the larger diameter section having an internally threaded region at 26. The smaller diameter section of conductor 23 opens into the resonator 11 and is coaxial therewith as shown in FIG. 1.

An inner conductor 29 of the resonator 11 is coaxially supported within the resonator outer conductor 14 by the assembly 12. One end of inner conductor 29 is spaced from the resonator end wall 18 to provide a quarter wavelength reentrant type of resonator, the other end of conductor 29 being joined to assembly 12 and formed as a part thereof.

An extension 30 from inner conductor 29 passes through the end face 20 of conductor 23 into the interior of conductor 23. A metallic sleeve 31 soldered to conductor 30 is supported in spaced coaxial relationship with the inner surface of conductor 23 by a dielectric sleeve 32 fitting between conductors 31 and 23. The dielectric sleeve 32 is press-fitted upon sleeve 31, and is further held in place by a retaining ring 35 affixed to sleeve 31 in abutment against one end of sleeve 32 and a flange extension 36 from sleeve 31 at the other end of the dielectric sleeve 32. The sleeve 31 and surrounding metallic wall of conductor 23 provide a short section of coaxial transmission line. Sleeve 31, a portion of conductor 30 and the resonator inner conductor 29 comprises center conductor means of device 12 and the resonator 11.

A U-shaped conductive member 37 has its base joined to center conductors 29 and 30 and the ends of its legs soldered to the end face 20 of conductor 23. The legs of the member 37 have cross-sections of configurations similar to those shown in FIG. 2, the base of member 37 comprising a rectangular cross-piece of metal integral with the center conductors 29 and 30. The conductive members 29, 30 and 37 are readily machined from one piece of metal. The purpose of the member 37 is to support the inner conductor 29 against axial displacement within the cylinder 14 while electrostatically shielding the transmission line formed by sleeve 31 and conductor 23 from excessive coupling with microwave energy in the resonator 11. The member 37 also provides a D.-C. return path to ground for crystal direct current while further providing a linkage with magnetic lines of force within resonator 11 for magnetic as well as electrostatic coupling to the transmission line formed by conductors 31 and 23.

The upper end of sleeve 31 within the assembly 12 is comprised of a plurality of resilient fingers providing a receptacle for receiving one contact pin 38 of the crystal detector 13, a spring-like contact being made between the pin 38 and the upper end of sleeve 31. The detector 13 has a dielectric casing 41 and a further contact pin 42 extending from the other end of the assembly 12 for connection to external apparatus comprising a suitable D.-C. load for crystal current. The crystal detector 13 comprises a conventional cartridge type silicon crystal diode whose end cap has been removed for the purpose of saving space.

A tubular metallic sleeve member 43 fitted about the casing 41 and contact pin 42 of crystal 43 is provided for support of the crystal detector 13. The portion of sleeve 43 about contact pin 42 is comprised of resilient fingers for spring-like engagement with crystal contact pin 42 and connection to the D.-C. load for crystal current. A dielectric cylinder 44 press-fitted into a threaded plug 47 coaxially supports and insulates the sleeve member 43 within plug 44, plug 47 being threaded into the end of housing 23 as illustrated in FIG. 1. A dielectric wafer 48 completes the insulation between metallic members 47 and 43 with the opposing surfaces of members 47 and 43 forming an R.F. bypass for high frequency currents.

Electromagnetic energy at a microwave frequency is supplied to the coaxial resonator 11 by means of an R.F. transmission line whose inner conductor 50 is terminated by a loop 51 within resonator 14. An end of loop 51 is connected to an inner portion of the cylindrical wall 14 of the resonator, the plane of loop 51 being parallel to the axis of the resonator 11 for excitation of the resonator in a dominant TEM coaxial line mode. As is known in the art, the electric field lines for this mode are comprised of symmetrically disposed radial field lines in planes at right angles with the resonator axis between the inner and outer conductors, the magnetic field line comprising concentric loops in planes also at right angles with the resonator axis.

The plug 18 at one end of resonator 11 is adjustable for changing the frequency of the resonator by virtue of a change in resonator volume and a change in capacitance between the end of conductor 29 and plug 18. Since the resonator of FIG. 1 is of the quarter wavelength open type, the magnetic field lines of force and high frequency currents at the region of plug 18 are at a minimum. Thus, spurious contact between plug 18 and the threaded portion 17 of conductor 14 is minimized. Once the resonator is adjusted for a desired operating frequency it should stay tuned to such a frequency even after the crystal 13 fails in its operation and has to be replaced.

The length of the transmission line formed by the sleeve 31 and the housing conductor 23 is preferably less than the order of ⅛ of a transmission line wavelength at the highest operating frequency of the resonator 11. This is desired so that load variations of the crystal detector 13 on the resonator 11 are minimized. Thus, one crystal may be readily interchanged with another without requiring that the resonator be returned for operation at the same frequency. In one structure which has been built for operation at a frequency within an S-band frequency range between two and four thousand megacycles, the aforementioned transmission line section had a characteristic impedance of ⅓ the impedance of the resonator along the section thereof whereat housing 12 has its smallest diameter. The crystal detector 13 used with such a structure comprised a 1N416 type crystal.

The point where the inside diameter of the housing 23 changes is governed primarily by mechanical considerations, and should be long enough to provide adequate mechanical support for the insulator 32 and the components supported thereby. It should not be too long, however, or it might interfere with the spring contact action of the upper end of sleeve 31 with the contact pin 38 of crystal detector 13.

Although there is magnetic coupling between the loop formed by member 37 and microwave resonator energy, most of the microwave energy supplied to the crystal 13 by the section of transmission line formed by conductors 31 and 23 is caused by excitation of this section of transmission line by electrostatic coupling to the resonator 14. The electrostatic coupling is a function of the radial electric lines of force across the aperture of the resonator end wall 20 between the inner conductor portion 30 and conductor 23. It has been found that the height of the legs of the U-shaped member 37 is not critical, but if the electrostatic shielding area provided by the aforementioned legs is increased in the vicinity of the aperture in wall 20, energy supplied to the aforementioned transmission line is reduced. Generally the amount of coupling is chosen so that approximately 5% of the energy within resonator 11 is transferred to crystal 13.

The height of the legs of the U-shaped member 37 is chosen for ease of manufacture, the legs being soldered to the end plate 20 for providing a convenient support. It is conceivable that the legs of member 37 might be dispensed with altogether, with the remaining base portion of member 37 lying in the plane of end surface 20 and soldered to the edge of the aperture in end surface 20. Such a member would still provide a low impedance path to ground for D.-C. crystal current while shielding the transmission line formed by conductors 31 and 23 so that only a sample of R.F. resonator energy is supplied to crystal 13.

The crystal assembly holder 12 has been illustrated as a holder for a cartridge crystal detector whose end cap has been removed. It would be apparent to those skilled in the art that the device 12 could readily be adapted for supporting a cartridge crystal whose end cap is intact about the crystal contact pin 42 to which the D.-C. load is to be connected. Furthermore, the assembly holder 12 could readily be adapted for supporting other types of crystal detectors including those referred to in the art as coaxial crystals.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In combination, a microwave coaxial line resonator having center conductor means supported substantially coaxially within a tubular outer conductor, means coupled to said resonator for supplying microwave electromagnetic energy thereto in a TEM coaxial line mode, said resonator having an apertured metallic end wall closing one end of said tubular conductor with said center conductor means extending therethrough in insulated relationship therewith, tubular metallic housing means connected to said end wall and extending therefrom away from said resonator along a portion of said center conductor means for providing a section of microwave transmission line, said transmission line and said resonator being in coaxial relationship with each other, and metallic means connected between said center conductor means and said end wall for partial electrical shielding of said transmission line from electromagnetic energy within said resonator, said metallic means and said end wall comprising a short-circuited end of said coaxial line resonator.

2. A coaxial line resonator comprising a tubular outer conductor that has a conductive end wall, an aperture through said end wall in coaxial relationship with said outer conductor, an inner conductor disposed within said outer conductor in coaxial relationship therewith, one end of said inner conductor extending through said aperture in spaced relationship with said end wall, metallic means extending across said aperture between said inner conductor and said end wall for providing a microwave short circuit that substantially shields said aperture from microwave energy within said resonator, a passageway by said last named means for coupling a small portion of microwave energy from said resonator to the portion of said inner conductor that is on the other side of said short circuit from the resonant part of said resonator, and means for supplying microwave energy to said resonator that excites the resonator in a TEM coaxial line mode.

3. A coaxial line resonator comprising a tubular outer conductor that has a conductive end wall, an aperture through said end wall in coaxial relationship with said outer conductor, an inner conductor disposed within said outer conductor in coaxial relationship therewith, one end of said inner conductor extending through said aperture in spaced relationship with said end wall, metallic means extending across said aperture between said inner conductor and said end wall for providing a microwave short circuit that substantially shields said aperture from microwave energy within said resonator, said metallic means comprising a U-shaped conductor whose legs are connected to said end wall on opposite sides of the aperture in said wall, the base of said U-shaped conductor comprising means for shielding the aperture in said end wall from all but a small percentage of the radial electric lines of force that extend between said metallic means and the tubular conductor of said resonator, and means for supplying microwave energy to said resonator that excites the resonator in a TEM coaxial line mode.

References Cited in the file of this patent

UNITED STATES PATENTS

| | | |
|---|---|---|
| 2,498,335 | Hunt | Feb. 21, 1950 |
| 2,557,122 | Leiphart | June 19, 1951 |
| 2,640,922 | McArthur | June 2, 1953 |
| 2,734,170 | Engelmann et al. | Feb. 7, 1956 |
| 2,817,760 | Dobbertin | Dec. 24, 1957 |
| 2,872,569 | Bredall | Feb. 3, 1959 |

FOREIGN PATENTS

| | | |
|---|---|---|
| 588,526 | Great Britain | May 27, 1947 |